Jan. 12, 1971  E. C. EBNER  3,553,872

INTERCHANGEABLE DISPLAY

Filed Sept. 20, 1968  2 Sheets-Sheet 1

INVENTOR.
EMANUEL C. EBNER
BY Joseph Weingarten
Lawrence A. Mayham
ATTORNEYS

Jan. 12, 1971 E. C. EBNER 3,553,872
INTERCHANGEABLE DISPLAY
Filed Sept. 20, 1968 2 Sheets-Sheet 2

INVENTOR.
EMANUEL C. EBNER
BY Joseph Weingarten
Lawrence A. Mayhew
ATTORNEYS

United States Patent Office 3,553,872
Patented Jan. 12, 1971

3,553,872
INTERCHANGEABLE DISPLAY
Emanuel C. Ebner, Chelmsford, Mass., assignor to Foto-Cube, Inc., Chelmsford, Mass., a corporation of Massachusetts
Filed Sept. 20, 1968, Ser. No. 761,101
Int. Cl. G09f 1/12
U.S. Cl. 40—152                                13 Claims

ABSTRACT OF THE DISCLOSURE

A display for the interchangeable presentation of pictures having a picture support member removably attachable to a back support member. These members may be used to attach pictures on a rigid picture support sheet to a wall or the like. The members are maintained in a predetermined orientation by a magnet and magnetic armature which may be separated by relative rotation about a locating pin.

FIELD OF THE INVENTION

This invention relates in general to picture display means and more particularly concerns a novel device for the interchangeable presentation of pictures on a wall or the like through the use of magnetic means.

DISCUSSION OF THE PRIOR ART

A picture, painting or photograph is, for practical purposes, of value to its owner only when it may be readily viewed by himself and others. Means for mounting such articles for continuous display are made in countless shapes, sizes and configurations. Most of these devices are reasonably satisfactory for continuous display of a single article, but are not adaptable for easy interchangeability of the displayed picture. One picture frame intended to interchangeably display pictures in the standard manner, that is, with a frame and a glass front, is disclosed in Pat. No. 1,626,150, issued to Parda on Apr. 26, 1927. Because it is intended to display relatively large pictures with a relatively heavy glass and frame, this device is somewhat complex and cumbersome to operate. Many other types of frames, although permitting the picture on display to be changed, are not designed to facilitate interchangeability so that when such changes are made there is often the danger of damage to either the picture, the frame, or both.

The present invention is concerned with a new dimension in the display of pictures, paintings and photographs, wherein the picture may be displayed against a color coordinated textured background having some of the effects of a frame, or it may be displayed completely without any included framing means. This display device allows a picture to be changed in a matter of seconds without any danger of damage to the pictures involved and without disturbing the display member which is normally rigidly mounted on a wall or the like. The plane of the picture is normally parallel to the plane of the wall, rather than titled as is conventional for framed pictures.

SUMMARY OF THE INVENTION

Broadly speaking, this invention resides in a display means comprising a back support member which may be adapted to be wall mounted, and a picture support member which may be adapted to be secured to a substantially rigid pictutre support sheet, the two display members being adapted to be removeably secured together.

The members comprising the display means may be configured in various ways. Normally a locating pin and one or more magnets are mounted on the back support member while an opening for registration with the locating pin is a part of the picture support member. The picture support member normally includes a metallic portion which is susceptible to magnetic attraction, this portion being termed the magnetic armature portion. Since the parallel or shear forces between a magnet and a metal object are relatively weak, the mounted picture may be easily rotated through a relatively small arc about the locating pin to separate the magnet from the metal magnetic armature portion, whereupon the picture support sheet may be removed and replaced by another which is fitted with a similarly configured picture support member. The picture support member may also be removably secured to the picture support sheet if desired. For purposes of the description herein, the back support member will be presumed to be normally mounted on a wall and the picture support member will be presumed to be normally mounted on a substantially rigid picture support sheet. It is understood that these members could be oppositely mounted.

This novel picture display allows pictures to be readily changed whenever desired and wherever the situation calls for it. For example, such a picture display means would be useful in schools for instruction purposes in art courses, as well as in an individual's home where he desires to change the art being displayed for various reasons, or where he may have insufficient wall space to accommodate all of the art he owns or would like to own. This invention is a novel but practical approach which allows for a change in one's viewing habits in the contemplation of art. Thus, for example, through the use of rigidly mounted prints equipped with this display means, the masters of painting may now be brought into the home to be enjoyed with the same ease that the masters of music are enjoyed by means of the record player. Furthermore, since the reverse side of the picture support sheet is, for the most part, unobstructed, expert descriptions of the art and its creator may be printed thereon, thus heightening the total pleasures of ownership and viewing. By means of separating the art to be viewed from the traditional heavy and bulky frame, considerable reduction in both weight and cost are realized, encouraging the creation of an art library in preference to the single, one-time purchase of framed art. In addition, this interchangeable picture display is versatile and may be used for displaying anything that is flat, such as prints of famous artists, paintings, photographs, citations, documents and certificates.

By means of this invention, the pictures being displayed may be alternated at any time or any number of times to suit the season or the occasion and are interchangeable to satisfy one's artistic and decorative tastes. Furthermore, because the pictures are rigidly mounted, any undisplayed pictures may be safely stored without fear of damage.

BRIEF DESCRIPTION OF THE DRAWING

The invention will be more fully understood from the following detailed description, taken in conjunction with the accompanying drawing, in which.

DESCRIPTION OF THE PREFERRED EMBODIMENTS

Figure 1:
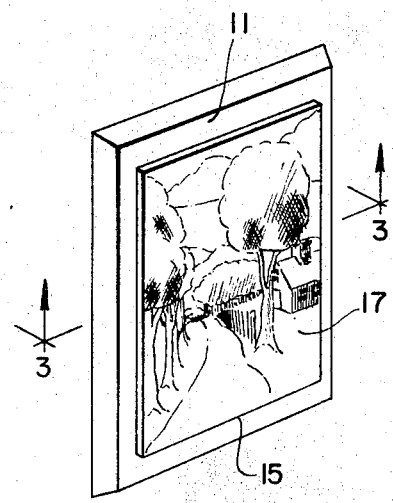
FIG. 1 is a perspective view of a preferred embodiment of this invention.
Figure 2:
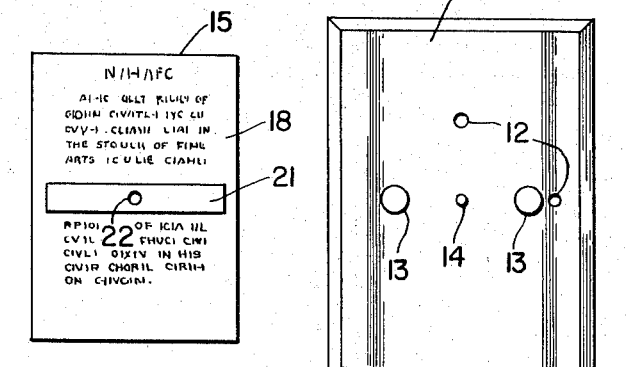
FIG. 2 is a separated view of the facing surfaces of the picture support member and the back support member shown in FIG. 1.
Figure 3:
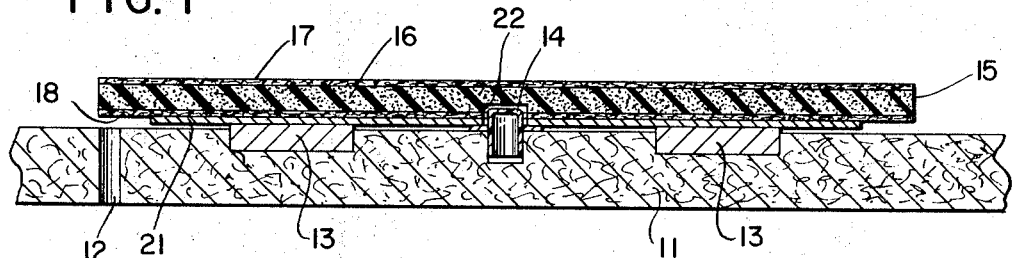
FIG. 3 is an enlarged partial cross-sectional view taken through cutting plane 3—3 of FIG. 1.

With reference now to the drawing and more particularly to FIGS. 1, 2 and 3 thereof, there is shown a preferred embodiment of the display for interchangeable presentation of pictures constructed according to this invention. Back support member 11, which may be a background mounting board having beveled edges, as shown in these figures, may be hung on a wall in a conventional manner, such as by means of a rail or screw (not shown) through either of holes 12. Note that this mounting means will maintain the plane of the picture parallel with the plane of the wall. Securely mounted on member 11 are magnets 13 which are spaced from locating pin 14. Picture support sheet 15 is shown as a substantially rigid laminar structure of a foamed plastic 16 sandwiched between the picture 17 and backing 18. The foam center 16 should be resistent to compression and relatively moisture repellent to prevent warping due to ambient dampness variations. Examples of satisfactory materials for this purpose are urethane and polystyrene foams. Picture 17 and backing 18 will normally be made of paper of some type. Picture support member 21, which includes a normally metallic magnetic armature portion, is secured to picture support member 15 on backing 18 by any suitable bonding material. Opening 22 in member 21 is adapted to register with locating pin 14 on member 11 while magnets 13 attract and engege flat magnetic armature portions of member 21 which are spaced from opening 22. As is clearly shown in FIG. 3, picture support member 21 is attracted to magnets 13 while locating pin 14 fits within opening 22 in member 21. The thickness of picture 17, backing 18 and member 21 are shown exaggerated in FIG. 3, with the result that picture support sheet 15 is shown spaced from background mounting board 11 a greater amount than would be true of an actual embodiment.

When it is desired to remove the picture from background mounting board 11, the picture support sheet is rotated about locating pin 14 thereby separating magnets 13 from member 21. This is readily accomplished because magnets possess comparatively weak parallel or shear forces, thereby allowing picture support member 21 to be rotated relatively easily with respect to the magnets. When it is desired to replace picture support sheet 15, backing 18 is faced toward member 11 with the picture skewed with respect thereto, and pin 14 is engaged with opening 22. When this alignment has been accomplished, the picture is then rotated to its proper orientation with respect to background mounting board 11.

Magnets 13 are positioned a substantial distance from the locating pin to allow member 21 to become totally disengaged from the magnets after a minimum of rotation of the picture support sheet. Furthermore, the width of the magnetic armature portions of member 21 which are adapted to contact magnet 13 are approximately equal to the width of the magnets and the distance between the locating pin and the magnet is preferably equal to or greater than the width of the magnet. These dimensions are desirable for ease of operation of the picture support, but are not absolutely required. For example, if either the magnets or armature portions are substantially widened in an angular direction (with locating pin 14 or opening 22 as the pivot point) substantially greater relative rotation will be necessary for separation of the magnets from the magnetic armature portions.

Since the greater part of backing 18 is not involved in the mechanical coupling of the picture to the back support member, this surface becomes a useful space whereon the description of the picture and the artist, or advertising material as desired, may be printed. Furthermore, advertising material may be printed on member 11 in such a position that it will be hidden by the picture when mounted thereon and so that it is exposed whenever the picture is changed.

From the above description it can be seen how the basic properties of the magnets and the locating pin are used in this novel combination. The magnets provide a holding force which may be termed "dry compression," that is, no intervening agents such as adhesives are required between the magnet and the magnetic armature portions of member 21. The magnets readily release the armature when a force is applied at right angles to the direction of the compressive force. Such a force, in this context, may be termed a release force. Locating pin 14 permits the picture to be readily positioned with respect to member 11 by acting as a locating and centering device. Additionally, the locating pin acts as a fulcrum for rotating the picture support sheet to free member 21 from the compressive forces of the magnet. Furthermore, the pin is a retaining member wherein its prevents sliding of the picture with respect to the back support member which might otherwise occur due to the weight of the picture when vertically mounted, such as on a wall. This permits a picture support sheet having a weight which is greater than the release force of the magnets to be firmly held in place by means of the combination of the locating pin and the magnets. The weight which the back support member is capable of supporting is only partially governed by the strength of the magnets used. The parallel component of the picture support sheet weight is supported primarily by the locating pin while any perpendicular components are supported by the magnetic forces. With a vertically displayed picture the parallel component is by far the larger of the two.

In practice, member 11 is normally semipermanently mounted on a wall or the like at a desired location, and several picture support sheets are equipped with mating picture support members 21. Then whenever it is desired to change a picture, the old one is simply rotated off and the new one rotated on. It is readily apparent from the foregoing description that reproductions of famous works of art may be interchangeably mounted on color coordinated background mounting boards. Thus a group of several pictures may be coordinated with a single background mounting board to be displayed thereon individually. The undisplayed members of the group may be stored safely when constructed as the laminar picture support sheets shown.

In this particular embodiment, back support member 11 is shown as a fiber board. It could, however, be made of wood, plastic or any other suitable material. Likewise, locating pin 14 is shown in FIG. 3 as a plastic member but it could well be made of metal or other substantially rigid material. The pin should have externally rounded edges to facilitate alignment and engagement with opening 22.

Figure 4:
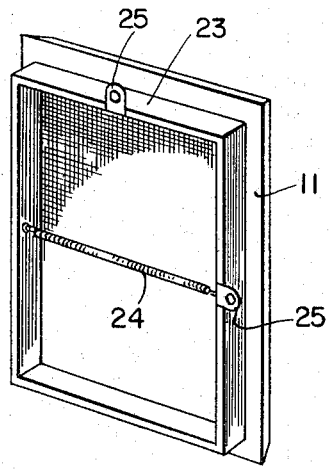
FIG. 4 is a rear perspective view of a modified embodiment of FIG. 1.
Figure 5:
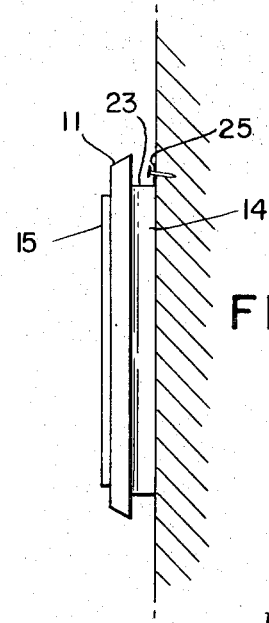
FIG. 5 is a side view of the embodiment of FIG. 4.

A modified version of the just described embodiment is shown in FIGS. 4 and 5 and includes a box-shaped structure 23 formed as part of back support member 11 on the back side thereof. This additional structure is adapted to hold several picture support sheets for ready accessibility when it is desired to change the picture being displayed. This configuration causes the picture to stand off the wall somewhat but the same parallel orientation of the plane of the picture to the plane of the wall is maintained. Since the foam laminate of picture support sheet 15 described herein is very light, the weight added by placing several of these mounts within the box structure 23 is not substantial as compared with the whole structure. This modification allows a single background mounting board and the pictures with which it is color coordinated to be located in one place so that changes may be easily made and the pictures not being displayed are readily accessible when changes are desired. The stored pictures are held in place in box structure 23 by means of flexible cable 24, which may be an elastic, a coiled spring or other suitable device. The modified member 11, with structure 23, may be hung on the wall by means of loops 25, placed on box structure 23 so that the picture may be hung in either vertical or horizontal orientation. FIG. 2 shows a similar arrangement of holes 12 for the hanging of member 11.

Figure 6:
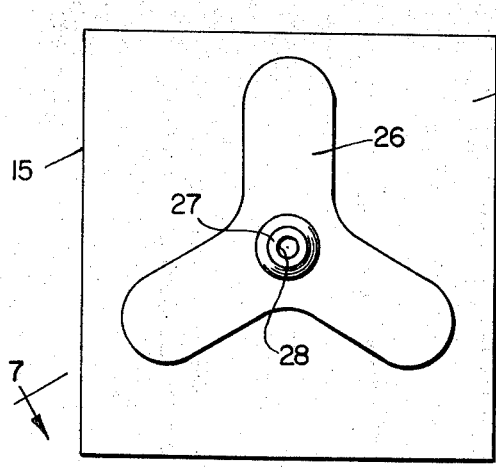
FIG. 6 is a separated view, similar to FIG. 2, of the facing surfaces of another embodiment of this invention.
Figure 6:
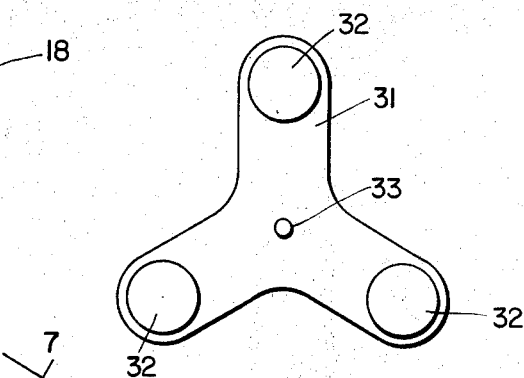
Figure 7:
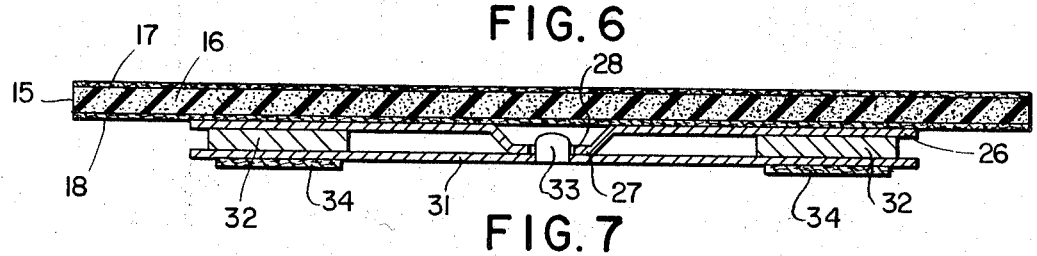
FIG. 7 is an enlarged cross-sectional view similar to FIG. 3 taken through cutting plane 7—7 of FIG. 6.

Another embodiment is shown in FIGS. 6 and 7, wherein the picture display means is configured so that the mounted picture may be viewed without interference by frames. The aesthetically pleasing result is that the pictures so displayed appear to be framed by the surrounding space. This is advantageous in several instances, such as, for example, where it is desired to view mass groupings of pictures in one area. Mounted on the back of picture support sheet 15 is picture support member 26 having raised portion 27 with a central opening 28 therein. Member 26 is also formed with a plurality of angularly spaced extended magnetic armature portions which have a yoke configuration in this embodiment. Back support member 31, as shown in FIG. 6, is constructed with magnets 32 and locating pin 33, and is configured in such a way that elements 32 and 33 are adapted to engage the spaced, extended armature portions of member 26 and its opening 28 respectively similarly to the corresponding elements shown in FIGS. 2 and 3. This configuration of the display device operates similarly to the embodiment of FIGS. 1, 2 and 3, and the relative dimensional specifications are preferably similar. For mounting member 31 on the wall, two-sided adhesive pads 34 may be attached to its reverse side as shown in FIG. 7. These pads are conventional in that both sides are coated with a pressure sensitive adhesive and covered with a strippable paper so that they may be applied as desired. These pads enable member 31 to be secured to a wall without doing any damage thereto. If desired, holes may be provided in the back support member so that nails or screws may be used for more permanent mounting.

It is immediately apparent from FIG. 7 that raised portion 27 of picture support member 26 is substantially the same height as are magnets 32, thereby permitting pin 33 to project little or no farther from member 31 than do magnets 32. An advantage of having opening 28 raised from the back of picture support sheet 15 is that no hole need be made in sheet 15 to accommodate locating pin 33. This allows the picture support sheet to be as thin as desired, completely independent of the requirement of the display device for a mating opening for the locating pin.

Figure 8:
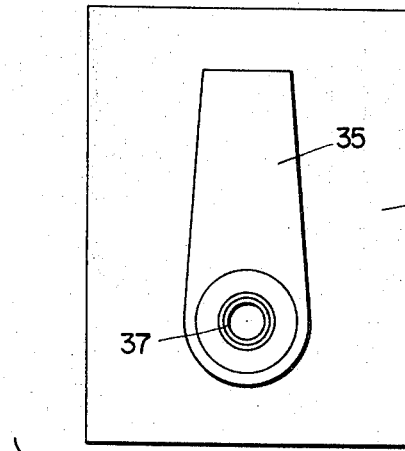
FIG. 8 is a separated view, similar to FIG. 2, of the facing surfaces of yet another embodiment of this invention.
Figure 8:
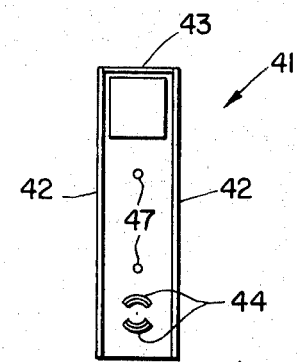
Figure 9:
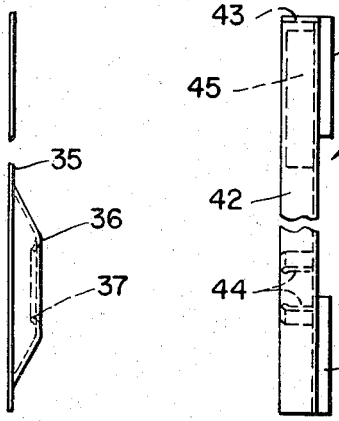
FIG. 9 is an enlarged elevational left side view of the picture support member shown in FIG. 8.
Figure 10:
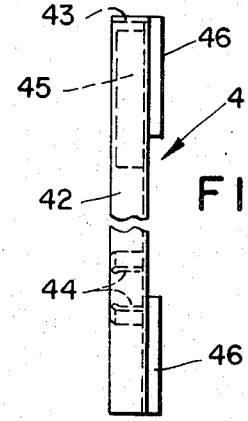
FIG. 10 is an enlarged elevational view of the right side of the back support member shown in FIG. 8.

Another embodiment of an interchangable picture display constructed according to the principles of this invention is shown in FIGS. 8, 9 and 10. Mounted on back surface 18 of picture support sheet 15 is picture support member 35 having raised portion 36 and a small opening 37 therein, the opening having a beveled inner edge. Back support member 41 is configured to engage member 35 and is formed with side walls 42 and end wall 43 which are perpendicular to the flat portion of member 41. Arcuate projections 44 correspond to locating pin 33 in FIG. 6 and are adapted to enter opening 37 in picture support member 35. Magnet 45 is mounted near the end of back support member 41 opposite from projections 44 and between side walls 42 and end wall 43. If necessary for mounting a very large picture, two or more magnets 45 may be inserted end-to-end between side walls 42 to give added support. Member 41 may be mounted to a wall by means of adhesive pads 46 similar to those shown in FIG. 7 or by means of nails (not shown) through holes 47.

After back support member 41 has been securely fastened to the wall, the picture support sheet, with picture support member 35 having a flat magnetic armature portion spaced from opening 37 mounted on the back thereof, is placed above and to one side of its engaging position with respect to member 41 and then slid sideways until raised portion 36 of picture support member 35 is located in the channel between side walls 42. Picture support sheet 15 is then slid downward until projections 44 engage opening 37 whereupon magnet 45 is aligned with and magnetically attract to the magnetic armature portion of picture support member 35. Final adjustments are then easily made by pivoting the picture for the proper orientation. The dimensional relationships of this embodiment are similar to those previously described.

It should be noted that several different materials may be used for the various elements involved in this picture display device. For example, the back support members 31 and 41 of FIGS. 6 and 8, respectively, may be made of such substantially rigid materials as metal, plastic, wood or fiber boards while the picture support members attached to the back of picture support sheet 15 must be of some material which is capable of being attracted by a magnet or at least have a flat magnetic armature portion having such a property. Although the picture support sheet is shown as a laminar structure of a foamed plastic surrounded by paper or light cardboard, other materials which are resistent to warping may be satisfactory. The locating pin may be metal or plastic, for example, and its head should be somewhat rounded to facilitate alignment with the opening in the mating picture support member.

In addition to the uses previously mentioned for this type of interchangable picture display means, other applications are available and are limited only by the imagination and needs of the user. For example, menus in restaurants where the fare is changed frequently would be a useful application of such a picture support, as would timetables for public transportation, such as buses, trains and airlines. Large picture displays in commercial enterprises wherein the displays are periodically changed, such as travel agencies where some of the picture displays are seasonal, would be exemplary of the type of situations wherein such mounting devices would be particularly advantageous.

It should be stressed that although the metal picture support member has a small opening and is attached to the picture support sheet in each embodiment disclosed herein, it may, for example, be formed with the locating pin and be attached to the wall, leaving the other member with the small opening and attached to the picture support sheet. Such changes do not affect the practice of this invention as described.

Although several embodiments have been shown and described herein, it is contemplated that various changes and modifications will occur to those skilled in the art which are within the principles of this invention.

I claim:

1. A display for the interchangeable presentation of pictures, comprising:
   a back support member;
   a picture support member adapted to be removably attached to said back support member so that said members have substantially parallel confronting surfaces; and
   retainer means mounted on the confronting surfaces of said back support member and said picture support member, said retainer means comprising mutually engageable magnetic means and means for pivoting said picture support member with respect to said back support member;
   said picture support member being readily separable from said back support member when said members are in a first predetermined relative angular position about said pivoting means with said confronting surfaces in substantially parallel relationship, wherein said magnetic means are separated to prevent their mutual engagement;

said picture support member being maintained in a predetermined position with respect to said back support member by said retainer means wherein said confronting surfaces are substantially parallel and in a spaced relationship when said members are in a second predetermined relative angular position such that said magnetic means on said confronting surfaces are in mutual engagement.

2. The display recited in claim 1, wherein:

said second predetermined relative angular position being angularly displaced from said first predetermined relative angular position; and said retainer means permits relative angular adjustment within said second predetermined relative angular position.

3. The display recited in claim 2, wherein:

said retainer means comprises:
   a magnetic armature; and
   a magnet;

said magnetic armature being mounted on one of said confronting surfaces and said magnet being mounted on the other of said confronting surfaces, whereby said magnetic armature is attracted by said magnet when said members are in said second predetermined relative angular position.

4. A display for the interchangeable presentation of pictures, comprising:

a back support member;

a picture support member adapted to be removably attached to said back support member; and retainer means mounted on the confronting surfaces of said back support member and said picture support member, said retainer means being operative when said members are in a first predetermined relative position to permit separation thereof, and operative when said members are in a second predetermined relative position to maintain a close relatively rigid spaced relationship therebetween, said retainer means permitting relative rotational movement between said back support member and said picture support member, said second predetermined relative position being angularly displaced from said first predetermined relative position, said retainer means further permitting relative angular adjustment within said second predetermined relative position;

said retainer means comprising:
   a magnetic armature;
   magnetic means, said magnetic armature being mounted on one of said confronting surfaces and said magnetic means being mounted on the other of said confronting surfaces, whereby said magnetic armature is attracted by said magnetic means when said members are in said second predetermined relative position; and
   pivot means mounted on said confronting usrfaces of said members, said pivot means permitting relative rotational movement between said members while preventing relative parallel displacement therebetween.

5. The display recited in claim 4, wherein:

said pivot means comprises a projection on one of said confronting surfaces and a mating opening formed in the other of said confronting surfaces.

6. A display for the interchangeable presentation of pictures on a wall or the like, comprising:

a picture support sheet;

a back support member;

a picture support member adapted to be removably attached to said back support member so that said members have substantially parallel confronting surfaces; and retainer means mounted on the confronting surfaces of said back support member and said picture support member, said retainer means comprising:
   a magnet secured to one of said confronting surfaces;
   a magnetic armature secured to the other of said confronting surfaces; and
   a projection on one of said confronting surfaces adapted to engage a corresponding opening in the other of said confronting surfaces;

said picture support member being rotatable relative to said back support member when said opening and projection are mutually engaged;

said picture support member being readily separable from said back support member when said members are in a first predetermined relative angular position with said confronting surfaces in substantially parallel relationship, wherein said magnets and said magnetic armature are separated to thereby prevent their mutual engagement;

said picture support member being maintained in a predetermined position with respect to said back support member by said retainer means wherein said confronting surfaces are substantially parallel and in a spaced relationship when said members are in a second predetermined relative angular position such that said magnet and said magnetic armature are in mutual engagement;

one of said members being adapted to receive and hold said picture support sheet and the other of said members being formed with means for attachment of said other member to said wall.

7. A display for the interchangeable presentation of pictures on a wall or the like, comprising:

a picture support sheet;

a back support member;

a picture support member adapted to be removably attached to said back support member; and retainer means mounted on the confronting surfaces of said back support member and said picture support member, said retainer means being operative when said members are in a first predetermined relative position to permit separation thereof, and operative when said members are in a second predetermined relative position to maintain a close relatively rigid spaced relationship therebetween;

said retainer means comprising:
   magnetic means mounted on said back support member;
   a flat magnetic armature connected to said picture support member;
   a projection on said back support member, said picture support member having an opening therein adapted to receive and engage said projection;

said magnetic means being adapted to engage said magnetic armature when said projection is engaged by said opening and when said members are in said second predetermined relative position;

one of said members being adapted to receive and hold said picture support sheet and the other of said members being formed with means for attachment of said other member to said wall.

8. The display recited in claim 7, wherein:

said magnetic means is spaced from said projection a distance at least equal to the angular width of said magnetic means at that location;

said magnetic armature is spaced from said opening a distance substantially equal to the distance said magnetic means is spaced from said projections, said magnetic armature having an angular width at that location substantially equal to the angular width of said magnetic means.

9. The display recited in claim 8, wherein:

said opening is raised from the surface of said picture support member by an amount substantially equal to the thickness of said magnetic means; and said projections has a height substantially equal to the thickness of said magnetic means.

10. A display for the interchangeable presentation of pictures, comprising:

a picture support sheet;

a picture support member formed with a central opening and at least one magnetic armature portion spaced from said opening, said picture support member being secured to one surface on said picture support sheet;

a back support member substantially larger than said picture support sheet;

a projection extending from and centrally located on one surface of said back support member; and at least one magnet spaced from said projection and secured to said one surface of said back support member;

said picture support member being adapted to be pivotably removably engaged with said back support member to maintain a close confronting relationship between said one surface of said picture support sheet and said one surface of said back support member;

whereby when said picture support sheet is in a first predetermined angular position relative to said back support member said projection and said opening are in engagement while said magnetic armature portion is angularly displaced from said magnet, thereby permitting said picture support sheet to be separated from said back support member, and whereby when said picture support sheet is in a second predetermined angular position relative to said back support member said projection engages said opening and said magnetic armature engages said magnet, thereby maintaining a close relationship between said confronting surfaces.

11. A display for the interchangeable presentation of pictures, comprising:

a picture support sheet;

a picture support member formed with a central opening and a plurality of flat magnetic armature portions extending from and anugularly spaced about said opening, said picture support member being secured to one surface of said picture support sheet;

a substantially flat back support member formed with a central projection extending from one surface thereof and a plurality of arms extending from and angularly spaced about said central projection, said back support member being shaped and configured to register with said picture support member, said central projection being adapted to engage said central opening; and a plurality of magnets individuallly mounted on said arms spaced from said central projection, said magnets being adapted to engage said magnetic armature portions of said picture support member;

said picture support member being adapted to be pivotably removably engaged with said back support member to maintain a close confronting relationship therebetween;

whereby when said magnetic armature portions are angularly displaced from said magnets said picture support member may be separated from said back support member, and whereby when said magnetic armature portions are in close confronting relationship with said magnets said picture support member is maintained in a close relatively rigid spaced relationship with said back support member.

12. A display for the interchangeable presentation of pictures, comprising:

a picture support sheet;

an elongated picture support member having an opening near one end and a flat magnetic armature portion at the other end, said picture support member being secured to one surface of said picture support sheet;

an elongated back support member formed with a projection extending from a flat surface near one end thereof and having coextensive elongated side walls extending from said flat surface, said back support member being shaped and configured to register with said picture support member, said projection being adapted to engage said opening in said picture support member when said opening is between said side walls; and at least one magnet mounted on the opposite end of said back support member between said side walls, said magnet being adapted to engage said magnetic armature portion of said picture support member;

said picture support member being adapted to be pivotably removably attached to said back support member to maintain a close confronting relationship therebetween;

whereby when said magnetic armature portion is angularly displaced from said magnet said picture support member is easily separable from said back support member; and whereby when said magnetic armature portion registers with said magnet said picture support member is maintained in close relatively rigid spaced relationship with said back support member.

13. A display for the interchangeable presentation of pictures on a wall or the like, comprising:

a picture support sheet;

a back support member;

a picture support member adapted to be removably attached to said back support member; and retainer means mounted on the confronting surfaces of said back support member and said picture support member, said retainer means being operative when said members are in a first predetermined relative position to permit separation thereof, and operative during a second predetermined relative position to maintain a close relatively rigid spaced relationship therebetween; said back support member being formed with a shallow box-shaped structure on the reverse side from said retainer means, said box-shaped structure being adapted to contain said picture support sheet;

one of said members being adapted to receive and hold said picture support sheet and the other of said members being formed with means for attachment of said other member to said wall.

References Cited

UNITED STATES PATENTS 2,785,490  3/1957  Fabry _____ 40—156
3,254,438  6/1966  Filary el al. _____ 40—156

JEROME SCHNALL, Primary Examiner

W. J. CONTRERAS, Assistant Examiner